United States Patent
Diamond

(10) Patent No.: US 11,770,375 B2
(45) Date of Patent: Sep. 26, 2023

(54) METHODS AND APPARATUS FOR COMMUNICATION

(71) Applicant: Kindli, Inc., Scottsdale, AZ (US)

(72) Inventor: Martin L. Diamond, Scottsdale, AZ (US)

(73) Assignee: Kindli, Inc., Scottsdale, AZ (US)

( * ) Notice: Subject to any disclaimer, the term of this patent is extended or adjusted under 35 U.S.C. 154(b) by 491 days.

(21) Appl. No.: 17/096,752

(22) Filed: Nov. 12, 2020

(65) Prior Publication Data

US 2022/0150240 A1    May 12, 2022

(51) Int. Cl.
*H04L 9/40* (2022.01)
*G06K 7/14* (2006.01)
*H04L 51/52* (2022.01)

(52) U.S. Cl.
CPC ........ *H04L 63/0853* (2013.01); *G06K 7/1413* (2013.01); *G06K 7/1417* (2013.01); *H04L 51/52* (2022.05); *H04L 63/0838* (2013.01)

(58) Field of Classification Search
CPC ... H04L 63/0853; H04L 51/52; G06K 7/1413; G06K 7/1417
See application file for complete search history.

(56) References Cited

U.S. PATENT DOCUMENTS

| | | |
|---|---|---|
| 6,480,958 B1 | 11/2002 | Harrington |
| 2006/0083228 A1 | 4/2006 | Ong et al. |
| 2008/0249947 A1 | 10/2008 | Potter |
| 2012/0233675 A1 | 9/2012 | Hird |
| 2016/0012412 A1 | 1/2016 | Scanlon et al. |
| 2017/0086070 A1* | 3/2017 | Henderson ............ H04L 63/102 |
| 2017/0344650 A1* | 11/2017 | Reinisch ................. H04L 51/52 |
| 2018/0121945 A1* | 5/2018 | Shiffert .................. G06Q 30/02 |
| 2019/0089700 A1* | 3/2019 | Caldwell ............. H04L 63/0853 |
| 2020/0159818 A1* | 5/2020 | Mendez ................ G06F 40/134 |
| 2020/0236105 A1* | 7/2020 | Doshi ................. H04L 63/0876 |

* cited by examiner

*Primary Examiner* — Shanto Abedin

(74) *Attorney, Agent, or Firm* — Noblitt & Newson, PLLC

(57) ABSTRACT

In various representative aspects, methods and apparatus for communications may operate in conjunction with a computer storage system storing information relating to multiple user accounts and a computer system coupled to the computer storage system. The computer system may receive an entry code from a visitor computer associated with at least one of the user accounts. If the entry code is valid, the computer system may receive a communication from the visitor computer and issue the communication, such as by posting to an associated user webpage. In various embodiments, the visitor computer is used by a user that is not registered with the social networking system or is not associated with the account associated with the webpage.

19 Claims, 8 Drawing Sheets

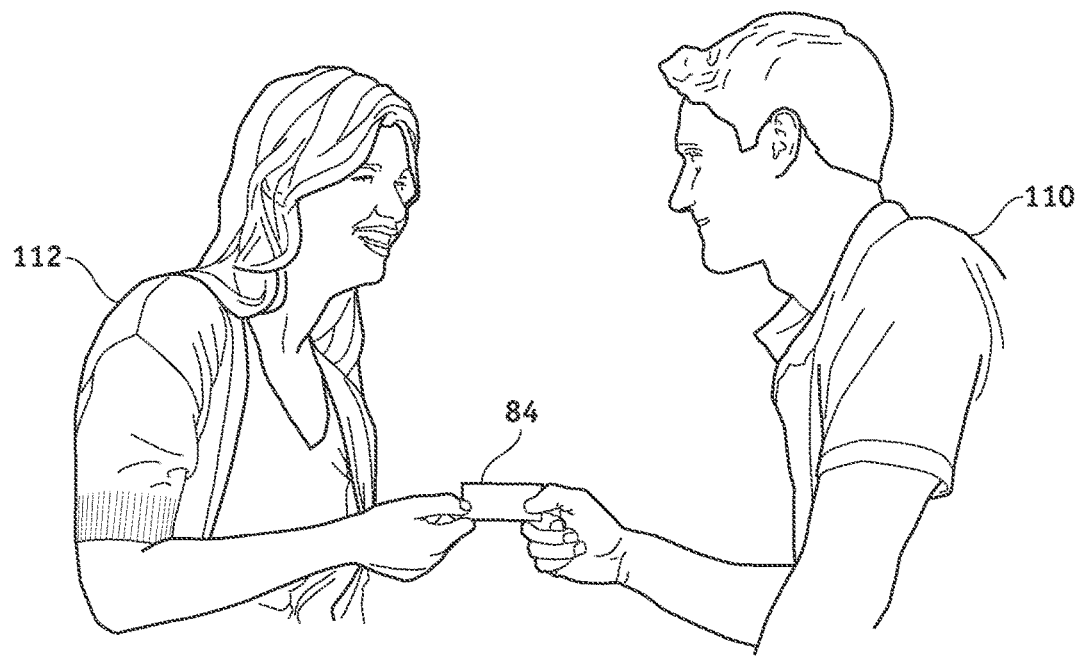
FIG. 4
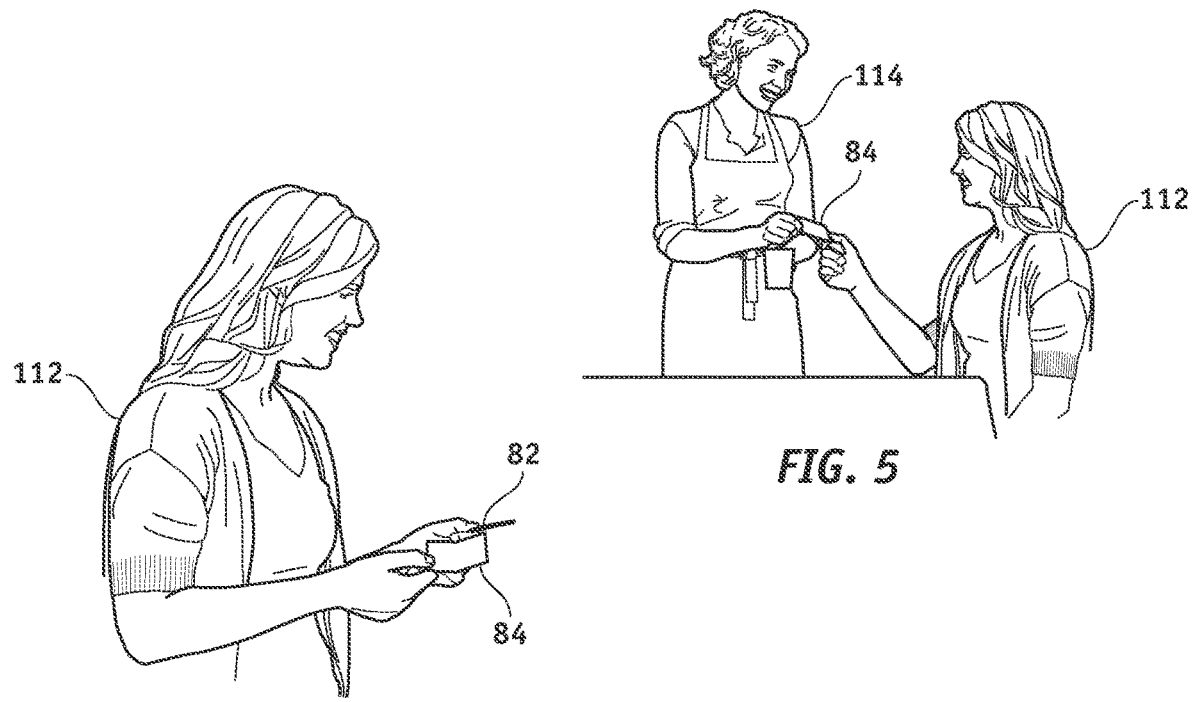
FIG. 5
FIG. 6

FIG. 12

METHODS AND APPARATUS FOR COMMUNICATION

BACKGROUND

Websites in the field of social networking, commonly referred to as social networking services or sites, are online platforms used by registered users to build social networks, business networks, and relations among other registered users through user webpages. Social networking services allow users to share content, such as information, ideas, digital photos and videos, posts, and advertising content with other users, and to inform other users about online or real-world activities and events.

If a benefactor performs a favor for a recipient, the recipient might post expressions of thankfulness and gratitude on the recipient's own social network user webpage, but does not customarily post such expressions on the user webpage of the benefactor because the benefactor may be unknown. Even if the benefactor can be found, the recipient cannot post any messages to the benefactor's user webpage unless the recipient is registered for the same social media service. Only upon registration and creation of a profile can content be posted for sharing with other registered users. Posting content to user webpages is restricted to registered users, so social networking services exclude non-registered users from acknowledging the benefactor.

SUMMARY

In various representative aspects, methods and apparatus for communication may operate in conjunction with a computer storage system storing information relating to multiple user accounts and corresponding users and/or user webpages and a computer system coupled to the computer storage system. The computer system may receive an entry code from a visitor computer associated with at least one of the user webpages. If the entry code is valid, the computer system may receive a post from the visitor computer and issue the post, such as to the associated user and/or user webpage. The computer system may then disable the entry code so that the entry code can no longer be used to communicate. In various embodiments, the visitor computer is used by a user that is not registered with the social networking system and is not associated with the account associated with the user webpage.

BRIEF DESCRIPTION OF THE DRAWINGS

A more complete understanding of the present methods and apparatus may be derived by referring to the detailed description and claims when considered in connection with the following illustrative figures. In the following figures, like reference numbers refer to similar elements and steps throughout the figures.

FIGS. 4 and 5 illustrate a transfer of the card;
FIG. 6 illustrates review of the card;
FIG. 12 illustrates a user webpage.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

Various aspects of the present technology may be described partly in terms of functional block components and various processing steps. Such functional blocks may be realized by any number of hardware or software components configured to perform the specified functions and achieve the various results. For example, the present technology may employ various machines, processors, and communications, e.g., servers, processors, graphical user interfaces, computers, smartphones, programs, social media, and the like, which may carry out a variety of functions under the control of one or more users, computers, or other control devices. In addition, the present technology may be practiced in conjunction with any number of social contexts and computing environments, and the systems described are merely exemplary applications for the technology. Further, the present technology may employ any number of conventional techniques for communications, web page presentation, posting content, providing entry codes, data processing, and the like.

Systems and methods according to various aspects of the present technology may operate in conjunction with a computer system, such as a computer system providing a social networking service over a network. The computer system may facilitate receiving and presenting information among users, both registered and unregistered. In various embodiments, communications between users are facilitated without using any social networking service, such as by facilitating communications directly between people.

Figure 1:
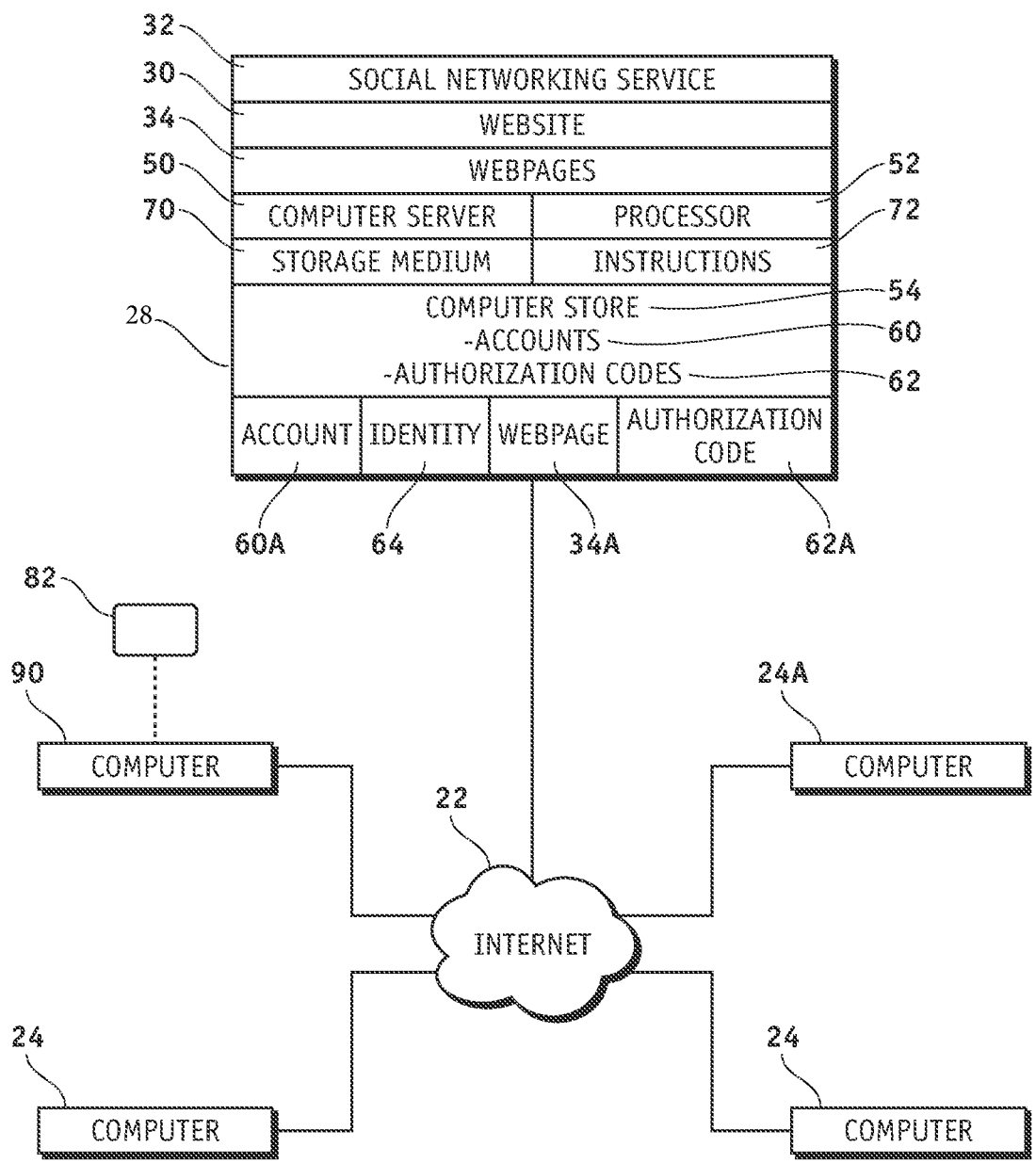
FIG. 1 represents a hardware and software architecture.

In one embodiment, referring to FIG. 1, user computers 24, 90 may access a website 30 of a social networking service 32. The social networking service 32 may be presented via a computer system 28 communicating with the user computers 24, 90 via a network, such as a global communications network like the Internet 22.

The social networking service 32 may comprise any appropriate social networking service, such as an online platform on which users build social networks and relationships with others who share similar personal or career interests, activities, backgrounds, or real-life connections. Exemplary social networking services 32, such as FACEBOOK®, TWITTER®, LINKEDIN®, etc., may be used by registered users to build social networks, business networks, and other relationships among other registered users through user webpages 34. In other embodiments, the social networking service 32 may be supplemented or replaced with an alternative communication system, such as email, text message, instant message, or electronic bulletin board.

In the present embodiment, the website 30 may comprise multiple webpages 34. The social networking service 32 may comprise the website 30, including webpages 34 associated with the accounts of registered users. Unregistered users can access or affect only certain webpages 34, such as a social networking service 32 home page and other public pages, for example an "about us" page, a contact page, and the like.

Registered users may more significantly affect webpages 34 associated with their accounts 60, such as by controlling the content displayed on their associated webpages 34. For example, registered users may access webpages 34 associated with their accounts 60, such as from user computers 24 via Internet 22 and log into their accounts 60 to access their webpages 34. The social networking service 32 may allow registered users to share content, such as information, ideas, digital photos and videos, posts, and advertising content with other registered users, and to inform other users about online or real-world activities and events, all via the user webpages 34.

In the present embodiment, each registered user may be associated with an account 60. Accounts 60 are different from one another, and each relates to or is otherwise associated with a particular user. The user associated with each account 60 may be a person or a business, and each account 60 may be allocated one or more user webpages 34 of the website 30. For example, a first user may have an account 60A with the social networking service 32. The account 60A may be assigned a user webpage 34A of the website 30. The user webpage 34A may be one or more webpages of the website 30.

Access to the user webpage 34A may be username/password protected. Like other user webpages 34, the first user may use the user webpage 34A to share content, such as posts. Account 60A of the first user may include a user profile associated with an online or user identity created by the first user through website 30 by filling out and submitting an online signup form or user profile through website 30. The online signup form or user profile may include graphical control elements, text fields, and the like, to provide the first user's information (e.g., name, address, email address, phone number, etc.), online or user identity 64, chosen login credentials (e.g., username and password) to access account 60A, user preferences, and the like.

Systems and methods according to various aspects of the present technology may allow an unregistered user to communicate with one or more registered users, such as by posting information to a registered user's webpage 34. In various embodiments, registered users of the social networking service 32 may selectively permit or invite others to add posts to their webpages or otherwise provide messages or other content, for example without requiring registration in the social networking service 32 or without requiring an association (such as a "friend" relationship) between users in the same social networking service 32.

For example, the social networking service 32 may invite the unregistered user to post content on the registered user's webpages 34, such as by providing a post interface on the unregistered user's computer. The unregistered user may then provide content to be posted on the registered user's webpage. In alternative embodiments, the content may be communicated solely to the user, or may be communicated via a different system, such as text, email, or the like.

The social networking service 32 may be implemented in any suitable manner, such as in conjunction with the computer system 28. The computer system 28 may comprise any suitable system for providing the social networking service 32 and/or the related services, including communicating with remote computers 24, 90. For example, the computer system 28 may include a computer server 50, such as a web server, comprising one or more processors 52, a memory, and a storage medium 70. In various embodiments, the computer system 28 may provide the website 30 and respond to requests from users and administrators to operate the website 30 and the social networking service 32.

The storage medium 70 stores information and instructions for operating the computer system 28. For example, the storage medium may include executable instructions 72 that, when executed by the computer processor 52 in response to inputs from the visitor computers 24, 90, cause the computer processor 52 to automatically effectuate its operations. In the present embodiment, the computer processor 52 may be programmed by instructions 72 maintained by the storage medium 70 to receive an entry code from a web browser of a visitor computer 90. The storage medium 70 may also implement a computer storage system 54, such as a digital computer database housing information regarding the accounts 60, including codes for gaining access to particular accounts, such as to post or otherwise control the content on user webpages 34 or facilitate communications.

The storage medium 70 may comprise any appropriate storage system for storing electronic information. For instance, the storage medium 70 may include program code (i.e., instructions 72) embodied in tangible storage media having a tangible physical structure. Examples of non-transitory tangible storage media may include floppy diskettes, CD-ROMs, DVDs, hard drives, or any other tangible machine-readable storage medium (computer-readable storage medium). In various embodiments, the processor 52 may operate in conjunction with a standard operating system to execute instructions 72 to operate the social networking service 32, including posting operations and access control operations.

Users may use the social networking service 32 and/or other aspects of the present technology using computers 24, 90. Registered users may authorize computers 24 to access their accounts, while an unregistered user's computer 90 may have only limited access to the website 30 or other aspects of the technology. The computers 24, 90 may comprise any suitable devices for gaining access to the website 30, such as a computer, laptop, tablet, or smartphone. The computers 24, 90 may access the social networking service 32 in any suitable manner, such as via a web browser or a dedicated app. In various embodiments, the computers 24, 90 may include scanning capabilities, such as in conjunction with a camera.

In various embodiments, the accounts 60 may be associated with authorization codes 62 for facilitating communications, such as providing content to a registered user and/or allowing limited access to a particular account's webpages 34 by a visiting user that is not otherwise associated with the account, such as an unregistered user or a user of a different account. The authorization code 62 may comprise any appropriate mechanism for verifying authorization to gain limited access to an account 60, such as a personal identifier, a unique alphanumeric code, or a biometric signature.

In various embodiments, the computer system 28 assigns one or more unique alphanumeric authorization codes 62 to a registered user's account 60. Each registered user may be allocated at least one unique authorization code 62 as part of the account 60. In various embodiments, the computer system 28 assigns multiple authorization codes 62 to each account 60 to provide limited access to different visiting users. In one embodiment, each authorization code 62 is a one-time code that is valid to provide a visiting user access for only one session, after which the authorization code 62 is no longer valid.

Each authorization code 62 may be associated with an account 60 and, in some embodiments, one or more user webpages 34. Activation of an authorization code 62 may provide the visiting user with any appropriate limited access or abilities, such as abilities to send messages or other content, view content, add content, or provide comments or icons on the account's webpages 34. For example, upon activation of a proper authorization code 62, the social networking service 32 may invite the visiting user to provide content to be added to the account's webpages 34 in the form of comments or provided to the account's registered user, such as feedback directed or relating to the account's registered user.

In various embodiments, the visiting user may visit the website 30 and activate the authorization code 62. The computer system 28 may verify the validity of the authorization code 62 and, if valid, provide a post interface to the visiting user's computer 90. The post interface provides an interface through which the visiting user may provide content, such as to be added to the account's webpages 34 or otherwise provided to the registered user or other parties. The computer system 28 may then post the content provided by the visiting user on the account's webpages 34 or otherwise send the content, terminate the post interface, and permanently deactivate the authorization code.

The authorization code may be activated in any suitable manner. For example, the visiting user may access the website 30 and provide an entry code into an appropriate field in publicly accessible webpages 34 of the website. In various embodiments, the entry code may be identical to an authorization code 62. The computer system 28 may compare the entry code to the activation codes to determine whether the entry code is associated with any valid activation codes 62. If the computer system 28 matches or otherwise associates the entry code with a valid activation code 62, the computer system 28 may grant limited access to the visiting user's computer 90, such as to facilitate communications or posts to the account 60 associated with the relevant activation code 62. Providing the entry code to open a posting interface or portal in the visitor computer 90 web browser to send communications, such as by issuing a post for the user webpage 34A, may eliminate the restrictive communications, such as posting of messages to the user webpage 34A by only registered users of the social networking service 32, and may facilitate communications by an unregistered or "out-of-network" user.

In various embodiments, the computer processor 52 may receive the entry code from a web browser of the visitor computer 90 and automatically compare the entry code to the authorization codes 62 in the computer storage system 54. If the entry code is associated with a valid authorization code 62, the computer processor 52 may automatically serve a post interface to the visitor computer 90. The visiting user may provide content to be communicated into the post interface, and the computer processor 52 may automatically post the content to the user webpage 34 associated with the relevant authorization code 62 or otherwise communicate the content. The content may be added to the account's webpages 34 or otherwise communicated without the visiting user needing an account with the social networking service 32 or knowing the identity or URL of the social networking service 32, the source of the user webpage 34, the online identity 64 associated with the user webpage 34, or otherwise having greater access to the computer system 28.

The entry code may be provided to the visiting user in any appropriate manner, form, or medium. For example, the social networking service 32 may provide the entry codes to the registered users of the accounts 60. The registered users may then provide one or more entry codes to visiting users, for example to invite a visiting user to post content to the registered user's webpages 34.

In various embodiments, the entry code may be conveyed to the visiting user via a carrier containing the entry code, such as an electronic communication or a physical medium.

Figure 2:
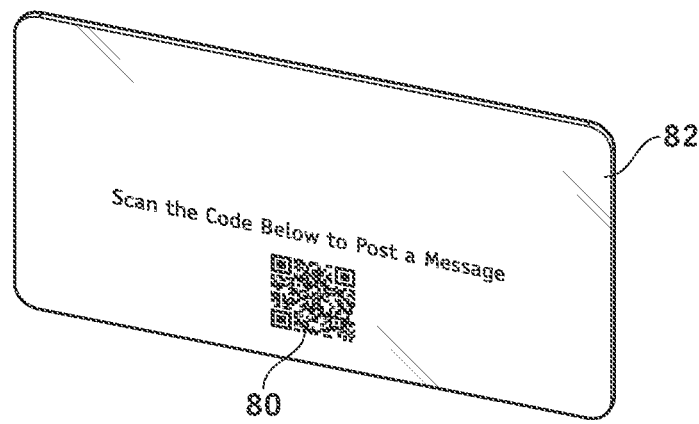
FIG. 2 is a perspective view of a card with an entry code.

For example, referring to FIG. 2, an exemplary carrier 82 may comprise a card comprising a substrate of paper, plastic, or other suitable material, like material used for business cards or credit cards. The material of the carrier 82 may be a recyclable material, and carrier 82 may be recycled following use, so that the carrier 82 is designed for a single use after which it is recycled or thrown away.

The carrier 82 may include the entry code or a representation, such as in the form of a printed password or other alphanumeric code, a bar code, an RFID component, an identification chip, or other unique identification mechanism. In the present embodiment, the carrier 82 includes a visual, machine-readable code 80, such as a form of matrix barcode commonly found under the trademark QR CODE®. The entry code may be identical to an authorization code 62 or may represent a code that can otherwise be associated with the authorization code 62 or a particular account 60.

As an example, upon creating the account 60A, the administrator of the social networking service 32 may send the carrier 82 incorporating the entry code to the registered user, such as by mail, courier, or other chosen delivery method. The registered user may give the carrier 82 to the visiting user, who later scans or otherwise enters the entry code via the visitor computer. Upon scanning or otherwise utilizing the entry code, the visitor computer 90 opens the post interface, allowing the visiting user to provide content. The computer system 28 may then communicate the content, such as by sending the content via a text message or email to the registered user or posting the content to the webpages 34 associated with the account 60 corresponding to the entry code and authorization code 62.

In an exemplary embodiment, the computer processor 52 is programmed to automatically issue a preview of the post to an interactive module in communication with the user webpage 34 associated with the authorization code 62 upon the computer processor 52 receiving an indication that the post interface has been activated by the visitor computer 90. The computer processor 52 may automatically communicate the post or add the post to the user webpage 34 associated with the authorization code 62 upon receiving an indication that the interactive module has been activated to express approval.

The registered user may provide the entry code to the visiting user, for example via the carrier 82. Referring to FIG. 4, a first person 110 is the registered user of the account 60A and the user of the user computer 24A and holds the carrier 82. A second person 112 is the visiting user and operates the visitor computer 90.

In this example, the first person 110 has performed a kind act for the second person 112, and the first person 110 intends to give his carrier 82 to second person 112, whether directly or indirectly, for her to use to send content, such as to send a text message or email or open a link or portal to his webpage 34A to enable her to issue a post to his user webpage 34A from her visitor computer 90. The kind act in this example is that the first person 110 has purchased breakfast for the second person 112 at a diner, and the first person 110 intends to provide the second person 112 with an opportunity to use the entry code on the carrier 82 to issue a message of appreciation.

Figure 3:
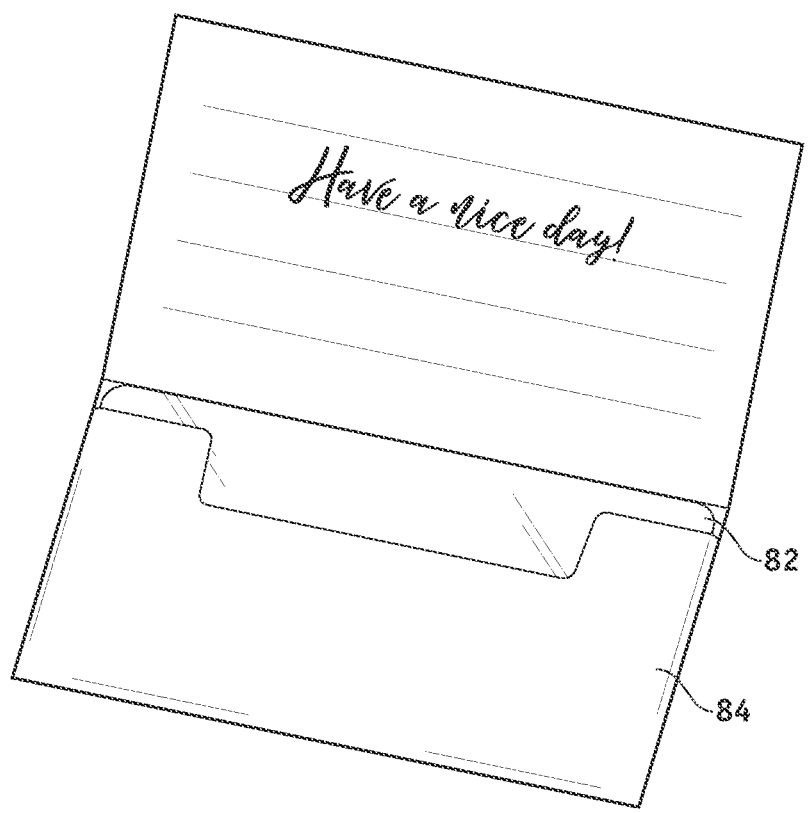
FIG. 3 is perspective view of the card and an envelope.

The carrier 82 may be provided in any suitable manner for presentation and use by the visiting user. For example, referring to FIGS. 3 and 4, the carrier 82 may be placed in an envelope 84 by the first person 110, who gives it directly to the second person 112, such as after the first person 110 performed his kind act. Alternatively, referring to FIG. 5, the first person 110 may give the enveloped carrier 82 to the second person 112 indirectly, for example by giving it to a third person 114 who, in turn, gives it to the second person 112 at the request of the first person 110. In this example, the third person 114 is a waitress at a diner where first person 110 bought the second person 112 her breakfast.

Figure 7:
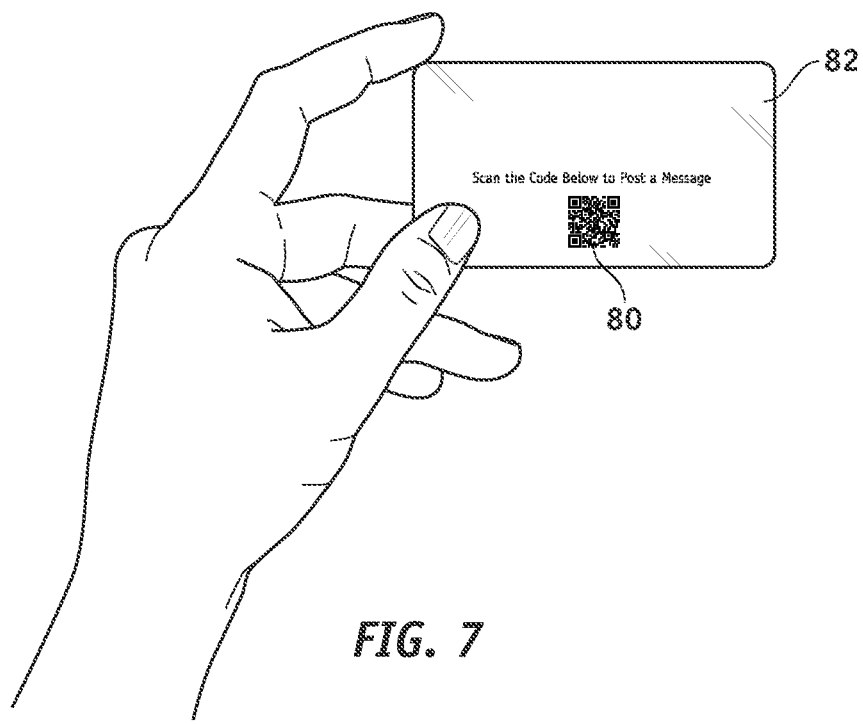
FIGS. 7 and 8 illustrate scanning the entry code.
Figure 8:
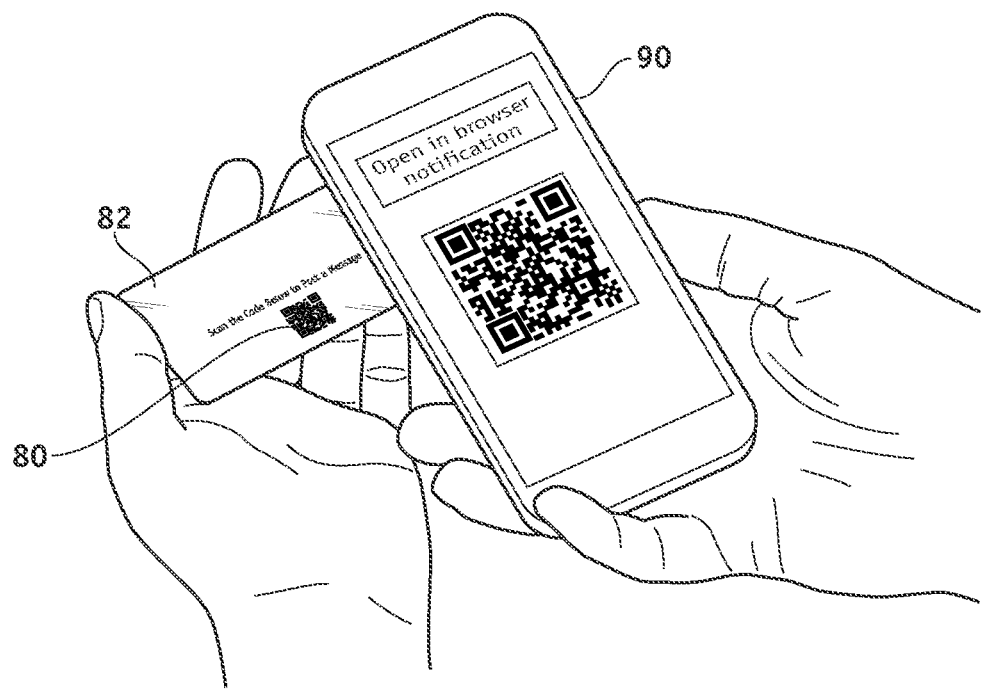

Referring to FIGS. 6 through 8, the second person 112 may remove the carrier 82 from the envelope 84 and enter the entry code into the visiting user's computer 90. In the present embodiment, the entry code is entered by scanning the code 80 using the camera on a smartphone and tapping a displayed notification. The visiting user's computer 90 may respond to the code by automatically establishing or opening from its web browser a link or portal to the website 30 via Internet 22 and providing the entry code over the link or portal.

The computer processor 52 in communication with the link or portal automatically receives the entry code from the visitor computer 90 and automatically compares the entry code to the authorization codes 62 in the computer storage system 54. If the entry code corresponds to a valid authorization code 60, the computer processor 52 may automatically serve a post interface 100 to the web browser of the visitor computer 90.

Figure 9:
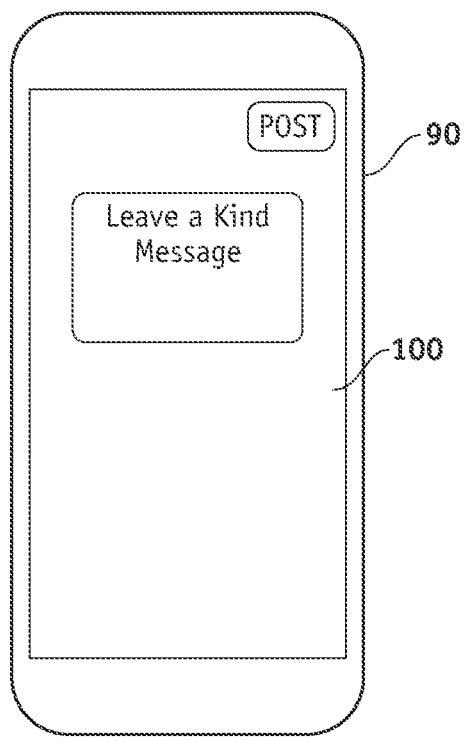
FIGS. 9 through 11 illustrate post interface displays on a visitor computer.
Figure 10:
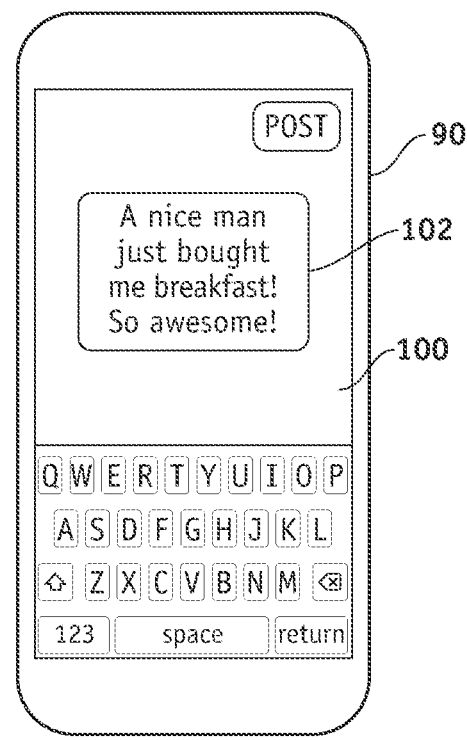
Figure 11:
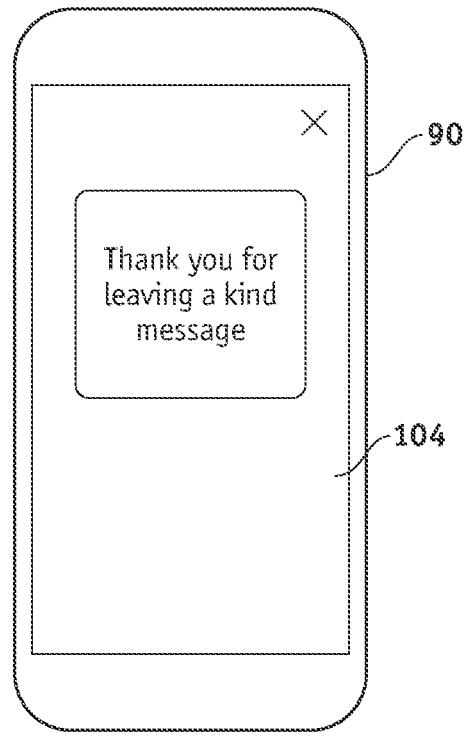

Referring to FIGS. 9 through 11, the post interface 100 invites the visitor computer 90 to issue a message for posting on the registered user's webpage 34A or otherwise sending to the registered user and/or other parties. For example, the post interface 100 may comprise a graphical user interface (GUI) including a post field and a user-activatable GUI control element (labeled "POST") that a user can activate to issue the post 102 entered into the post field. Activation of the control element following entry of the post 102 into the post field indicates that the post interface 100 has been activated.

The visiting user may enter a post 102, such as a message or other content, into the post interface 100. In this example, the post 102 entered into and issued from the post interface 100 is "A nice man just bought me breakfast! So awesome!" The post 102 may be any content chosen by the visiting user, and can include text, images, icons, video, or other content chosen by the second person 112.

In this example, the post 102 is a "thank you" message from the second person 112 to the first person 110 for having purchased her breakfast. Other kind acts that could be recognized by the second user 112 could include helping her across the street, helping her fix a flat tire, buying her groceries, wishing her words of encouragement, or the like.

Figure 14:
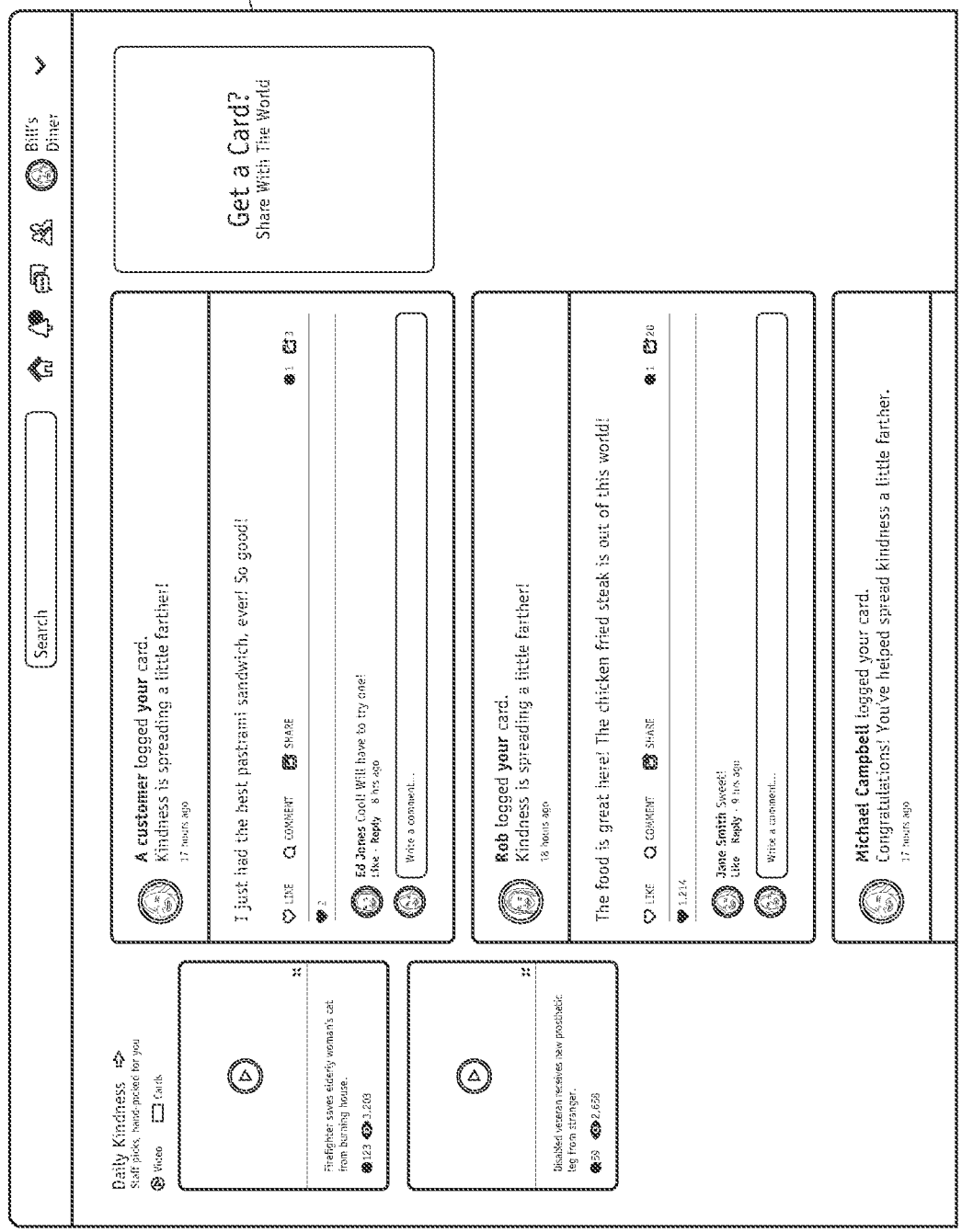
FIG. 14 illustrates a user webpage.

In other cases, possible interactions may include business interactions, such as a person eating a good meal from a restaurant or food stand, receiving exemplary service from an automobile service or sales center, receiving a good haircut from a barber, receiving a good massage from a masseuse, etc. For example, referring to FIG. 14, the registered user is a business called "Bill's Diner" and has a corresponding registered user's webpage 34B. The registered user's webpage 34B may include posts of favorable reviews that may create interest among prospective customers in the products, services, expertise, knowledge, or qualifications of the business.

Figure 12:
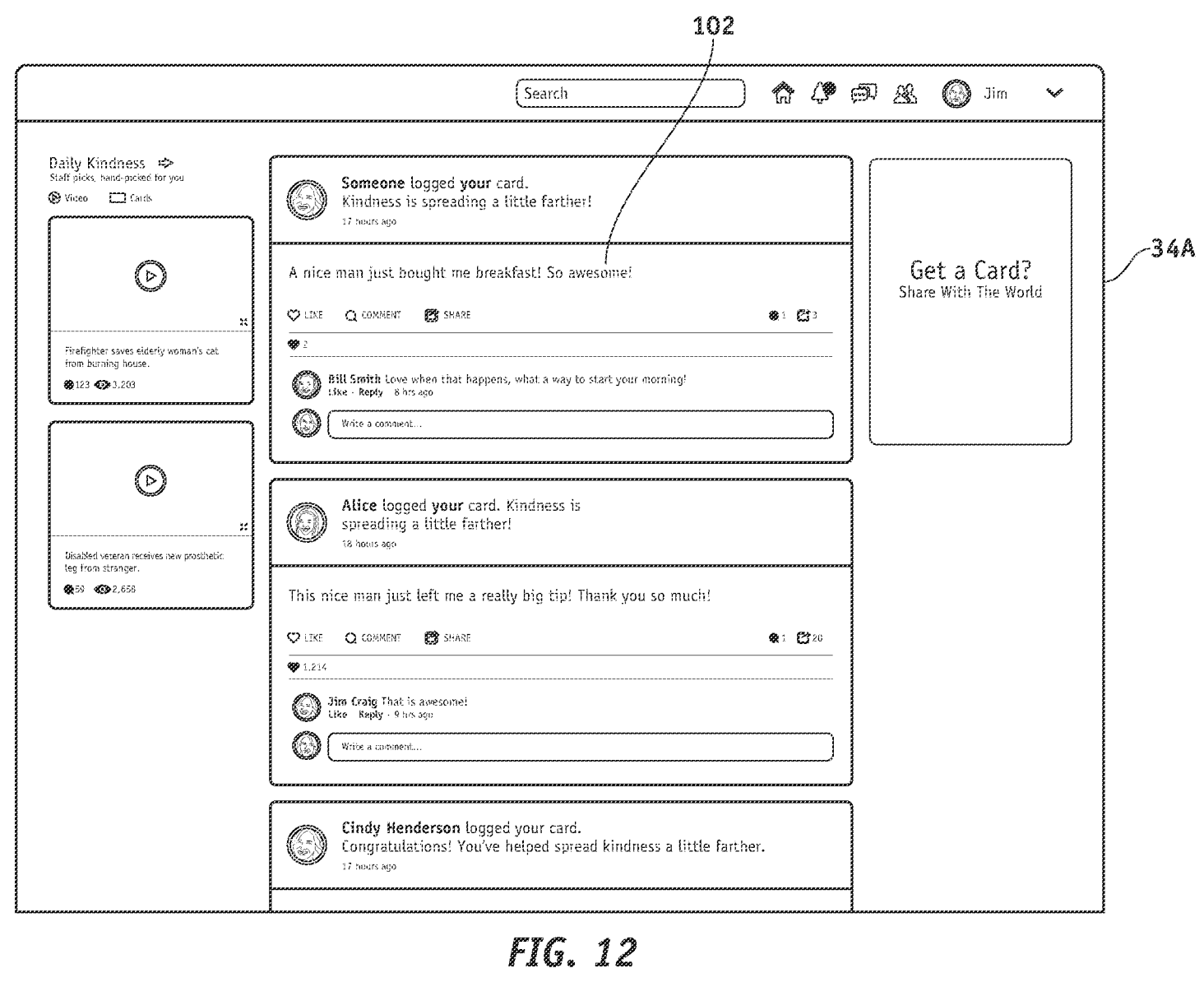

Referring to FIG. 12, upon receiving the post 102, the computer processor 52 may automatically issue the post 102 to the registered user's webpage 34A or otherwise communicate the content of the post 102. The computer processor 52 may insert the content of the post 102 in the user's webpage 34A using the format of the user's webpage 34A such that the content appears similar to other content entered by registered users. In the present example, the post 102 is indicated as being from an anonymous sender. In various embodiments, the name or identity of the sender of the post 102 may be made available, such as by allowing the visiting user to provide her name, contact information, or other information via the post interface 100.

Figure 13:
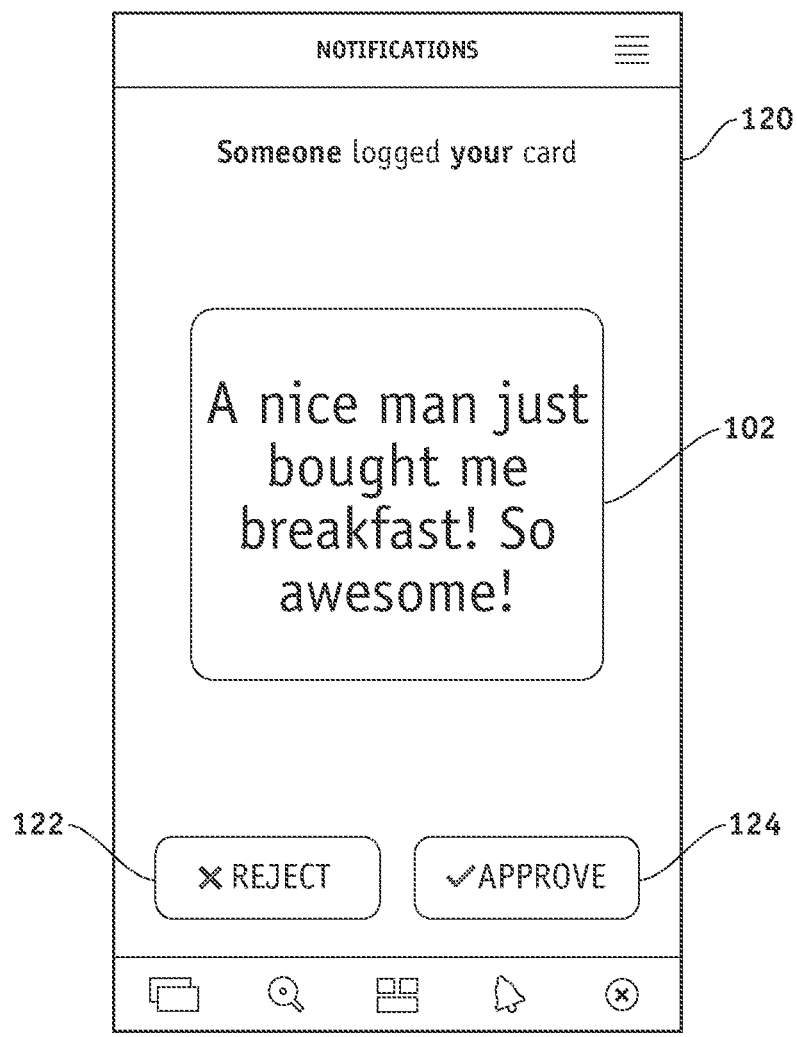
FIG. 13 illustrates post preview interface display.

The computer system 28 may also automatically issue a preview of the post 102 to the registered user, for example to receive approval of the post before display on the registered user's webpage 34. For example, referring to FIG. 13, the computer processor 52 may provide an interactive post preview module 110 to the registered user's computer 24A, such as via the registered user's webpage 34A. The post preview module 110 may comprise a GUI including a user-activatable GUI control element (labeled "REJECT") that the registered user can activate to reject the post 102, and a user-activatable GUI control element (labeled "APPROVE") that the registered user can activate to approve the post 102. If the post 102 is rejected, the computer processor 52 may automatically delete the post 102 without posting it to the registered user's webpage 34A or otherwise communicating it.

The computer processor 52 may automatically invalidate the used authorization code 62A to prevent further use of the authorization code 62, which may restrict use of the post interface 100 to a single posting session. The computer processor 52 may also decommission the post interface 100. For example, referring to FIG. 11, after receiving the post 102, the computer processor 52 may issue a decommission message to the visitor computer 90 and close the link or portal. The second user 112 may dispose of the carrier 82.

The present technology is described above with reference to illustrative embodiments. Changes and modifications may be made in the described embodiments without departing from the nature and scope of the claimed subject matter. In addition, although the first user of user webpage 34A is furnished with one authorization code 62A and one corresponding identical entry code on one carrier 82, the first user can be furnished with multiple different authorization codes 62 and corresponding different entry codes each on its own carrier 82 for first user to selectively hand out as desired.

The content posting operations are discussed with an "out-of-network" visiting user. The content posting operations can be equally carried out with an "in-network" visiting user, such as any user of any user computer 24 associated with an account 60. While the described embodiments are configured to open posting interfaces or portals in web browsers of the visiting user's computer in selective communication with user webpages of a social networking service, the technology can be implemented to open posting interfaces or portals to any chosen webpages regardless of whether they are part of a social networking service.

Various further changes and modifications may be made to the embodiments chosen for purposes of illustration. To the extent that such modifications and variations do not depart from concepts described, they are intended to be included.

In the foregoing specification, the technology has been described with reference to specific exemplary embodiments. Various modifications and changes may be made, however, without departing from the scope as set forth in the claims. The specification and figures are illustrative, not restrictive, and modifications are intended to be included within the scope of the claims. Accordingly, the scope of the claims should be determined by the language of the claims and their legal equivalents rather than by merely the examples described.

For example, the steps recited in any method or process claims may be executed in any order and are not limited to the specific order presented in the claims or the detailed description. Additionally, the components and/or elements recited in any apparatus claims may be assembled or otherwise operationally configured in a variety of permutations and are accordingly not limited to the specific disclosed configurations.

Benefits, other advantages, and solutions to problems have been described with regard to particular embodiments. Any benefit, advantage, solution to problem, or any element that may cause any particular benefit, advantage, or solution to occur or to become more pronounced are not to be construed as critical, required, or essential features or components of any or all the claims.

The terms "comprise," "comprises," "comprising," "having," "including," "includes" or any variations of such terms, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials, or components used in practice, in addition to those not specifically recited, may be varied or otherwise particularly adapted to specific environments, manufacturing specifications, design parameters, or other operating requirements without departing from the general principles of the same.

The invention claimed is:

1. A system providing communications and accessible by a visitor computer, comprising:
   a computer storage system storing information relating to multiple user accounts associated with corresponding user passwords;
   a computer processor coupled to the computer storage system, wherein the computer processor is programmed to:
     receive from the visitor computer an entry code associated with at least one of the user accounts, wherein the entry code is not the user password;
     automatically determine the validity of the entry code;
     receive a content from the visitor computer;
     automatically post the content on a user webpage associated with the at least one of the user accounts if the entry code is valid; and
   a carrier, wherein the entry code is included on the carrier.

2. The system according to claim 1, wherein the computer processor is additionally programmed to automatically invalidate the entry code after receiving the content from the visitor computer.

3. The system according to claim 1, wherein the computer processor is further programmed to:
   automatically serve a post interface to the visitor computer if the entry code is valid;
   receive the content from the visitor computer via the post interface; and
   decommission the post interface from the visitor computer.

4. The system according to claim 1, wherein the computer processor is additionally programmed to:
   automatically issue a preview of the content to an interactive module associated with the at least one of the user webpages; and
   automatically post the content upon receiving an approval of the content from the interactive module.

5. The system according to claim 1, wherein the carrier comprises a physical card.

6. The system according to claim 5, wherein the entry code is represented on the card as a machine-readable code.

7. A social networking system providing user account webpages associated with user passwords and accessible by a visitor computer, comprising:
   a carrier including an entry code associated with at least one of the user account webpages;
   a computer storage system storing information relating to the user account webpages; and
   a computer processor coupled to the computer storage system, wherein the computer processor:
     receives the entry code from the visitor computer, wherein the entry code is not the user password associated with the at least one of the user account webpages;
     automatically determines the validity of the entry code;
     receives a post from the visitor computer; and
     automatically displays the post on the at least one of the user account webpages associated with the entry code if the entry code is valid.

8. A social networking system according to claim 7, wherein the carrier includes the entry code in the form of a machine-readable code, and wherein the entry code received from the visitor computer is the entry code scanned from the carrier.

9. The system according to claim 7, wherein the computer processor automatically invalidates the entry code after receiving the post from the visitor computer.

10. The system according to claim 7, wherein the computer processor:
    automatically serves a post interface to the visitor computer if the entry code is valid;
    receives the post from the visitor computer via the post interface; and
    decommissions the post interface from the visitor computer.

11. The system according to claim 7, wherein the computer processor:
    automatically issues a preview of the post to an interactive module associated with the at least one of the user account webpages; and
    automatically issues the post to the at least one of the user account webpages associated with the entry code upon receiving an approval of the post from the interactive module.

12. The system according to claim 7, wherein the carrier comprises a physical card.

13. A method of posting a visitor post on a webpage associated with an account having a password of a social networking service, comprising:
    providing a carrier with an entry code associated with the webpage associated with the account of the social networking service, wherein the entry code is not identical to the password;
    receiving the entry code by a computer from a visiting computer;
    automatically confirming the validity of the entry code;
    receiving the visitor post from the visitor computer; and
    automatically issuing the visitor post to the webpage if the entry code is valid.

14. The method of posting according to claim 13, further comprising invalidating the entry code after receiving the visitor post from the visitor computer.

15. The method of posting according to claim 13, further comprising:
   automatically serving a post interface to the visitor computer if the entry code is valid;
   receiving the visitor post from the visitor computer via the post interface; and
   decommissioning the post interface from the visitor computer.

16. The method of posting according to claim 13, further comprising:
   automatically issuing a preview of the visitor post to an interactive module associated with the account; and
   automatically issuing the visitor post to webpages associated with the entry code upon receiving an approval of the visitor post from the interactive module.

17. The method of posting according to claim 13, wherein the carrier comprises a physical card.

18. The method of posting according to claim 17, wherein the entry code is represented on the card as a barcode.

19. The method of posting according to claim 17, wherein the entry code is represented on the card as a machine-readable code.

* * * * *